United States Patent
Akoma et al.

(10) Patent No.: US 11,292,425 B2
(45) Date of Patent: Apr. 5, 2022

(54) SAFETY DEVICE

(71) Applicant: Schroth Safety Products LLC, Pompano Beach, FL (US)

(72) Inventors: Patrick Akoma, Pompano Beach, FL (US); Manuel Marroquin, Pompano Beach, FL (US)

(73) Assignee: SCHROTH SAFETY PRODUCTS LLC, Fort Lauderdale, FL (US)

( * ) Notice: Subject to any disclaimer, the term of this patent is extended or adjusted under 35 U.S.C. 154(b) by 0 days.

(21) Appl. No.: 16/952,236

(22) Filed: Nov. 19, 2020

(65) Prior Publication Data

US 2021/0146879 A1    May 20, 2021

Related U.S. Application Data (60) Provisional application No. 62/937,560, filed on Nov. 19, 2019.

(51) Int. Cl.
| | |
|---|---|
| *B60R 22/14* | (2006.01) |
| *B60R 22/02* | (2006.01) |
| *B60R 22/46* | (2006.01) |
| *B60R 22/195* | (2006.01) |
| *B60R 22/00* | (2006.01) |

(52) U.S. Cl.
CPC ............. *B60R 22/14* (2013.01); *B60R 22/02* (2013.01); *B60R 22/195* (2013.01); *B60R 22/46* (2013.01); *B60R 2022/006* (2013.01)

(58) Field of Classification Search
CPC ....... B60R 22/14; B60R 22/02; B60R 22/195; B60R 2022/006; B60R 22/46; B60R 21/18; B60R 22/185; B60R 22/1855
See application file for complete search history.

(56) References Cited

U.S. PATENT DOCUMENTS

| | | | |
|---|---|---|---|
| 4,551,889 A | * | 11/1985 | Narayan ................ A44B 11/10 24/171 |
| 5,839,753 A | | 11/1998 | Yaniv et al. |
| 5,871,230 A | | 2/1999 | Lewis |

(Continued)

FOREIGN PATENT DOCUMENTS

| | | |
|---|---|---|
| EP | 1568549 B1 | 1/2008 |
| EP | 1990243 A4 | 4/2009 |

(Continued)

*Primary Examiner* — James A English
*Assistant Examiner* — Matthew D Lee
(74) *Attorney, Agent, or Firm* — Trueba & Suarez PLLC; Roberto M. Suarez; William R. Trueba, Jr.

(57) ABSTRACT

A pretensioning lapbelt apparatus where the pretensioning of the lapbelt is performed by the rapid inflation of an airbag that is integral to the lapbelt itself. The design of the airbag, including the attachment locations of the ends of the webbing are chosen such that, upon inflation of the airbag, the free end of the webbing—the end of the webbing that is passed through the cinching latch—is pulled taught, thereby reducing the effective length of the lapbelt. The anchor is designed to be a cinching anchor such that once the airbag deploys and pulls the webbing through the anchor (thereby pretensioning the lapbelt) a sliding pin in the anchor "cinches" the webbing, effectively locking the webbing in the pretensioned state.

3 Claims, 10 Drawing Sheets

(56) References Cited

U.S. PATENT DOCUMENTS

| | | | |
|---|---|---|---|
| 6,293,582 B1 * | 9/2001 | Lewis | B60R 22/14 |
| | | | 280/735 |
| 6,419,263 B1 | 7/2002 | Büsgen et al. | |
| 6,523,856 B2 * | 2/2003 | Braun | B60R 21/18 |
| | | | 280/733 |
| 6,648,369 B2 | 11/2003 | Mishima et al. | |
| 7,237,800 B2 | 7/2007 | Itoga | |
| 7,377,544 B2 | 5/2008 | Itoga | |
| 7,481,452 B2 | 1/2009 | Itoga et al. | |
| 7,661,697 B2 | 2/2010 | Itoga | |
| 7,748,735 B2 | 7/2010 | Itoga | |
| 7,798,522 B2 | 9/2010 | Itoga | |
| 7,815,218 B2 | 10/2010 | Itoga | |
| 7,871,105 B2 | 1/2011 | Itoga | |
| 7,874,581 B2 | 1/2011 | Itoga | |
| 7,905,514 B2 * | 3/2011 | Thomas | B60R 22/1954 |
| | | | 280/733 |
| 8,016,362 B2 | 9/2011 | Itoga | |
| 2002/0105176 A1 | 8/2002 | Hammer et al. | |
| 2003/0197415 A1 * | 10/2003 | Dingman | A44B 11/10 |
| | | | 297/468 |
| 2009/0066064 A1 * | 3/2009 | Murakami | B60R 21/18 |
| | | | 280/733 |
| 2009/0160167 A1 | 6/2009 | Itoga | |

FOREIGN PATENT DOCUMENTS

| | | | | |
|---|---|---|---|---|
| FR | 2442058 A1 * | 6/1980 | | B60R 21/18 |
| GB | 2519449 A * | 4/2015 | | B60R 21/18 |
| JP | 2006088899 A * | 4/2006 | | B60R 21/18 |
| JP | 2007045391 A * | 2/2007 | | B60R 21/18 |
| JP | 2007161206 A * | 6/2007 | | |
| JP | 5914167 B2 | 12/2013 | | |
| JP | 5476191 B2 * | 4/2014 | | |
| JP | 2017528362 A | 9/2017 | | |
| SE | WO 02/32727 A1 | 4/2002 | | |
| WO | WO-9706983 A1 * | 2/1997 | | B60R 21/18 |

* cited by examiner

SAFETY DEVICE

CROSS-REFERENCE TO RELATED APPLICATIONS

This application is a non-provisional of, and claims priority to, U.S. Provisional Patent Application No. 62/937,560, titled "Safety Device," with a filing date of Nov. 19, 2019; which is incorporated by reference as if fully set forth herein.

FIELD OF THE INVENTION

The present invention generally relates to a safety device and more specifically, to an apparatus, system, and related method using an airbag and a cinching anchor to pretension a lap belt for securing a seat occupant in an aircraft, or other vehicle, during a sudden acceleration/deceleration such as a crash event.

BACKGROUND OF THE INVENTION

Similar to the safety regulations and requirements for most motor vehicles traveling along the highways and byways of the United States, inflatable airbag systems are required in most aircraft which traverse U.S. airways. Also, similar to the National Highway Safety Administration which issues and administers Federal Motor Vehicle Safety Standards ("FMVSS") regarding the manufacture of motor vehicles and equipment therein, the Federal Aviation Administration ("FAA") establishes standards for the regulation of aircraft and equipment utilized therein, including Federal Aviation Requirements ("FAR").

Figure 1:
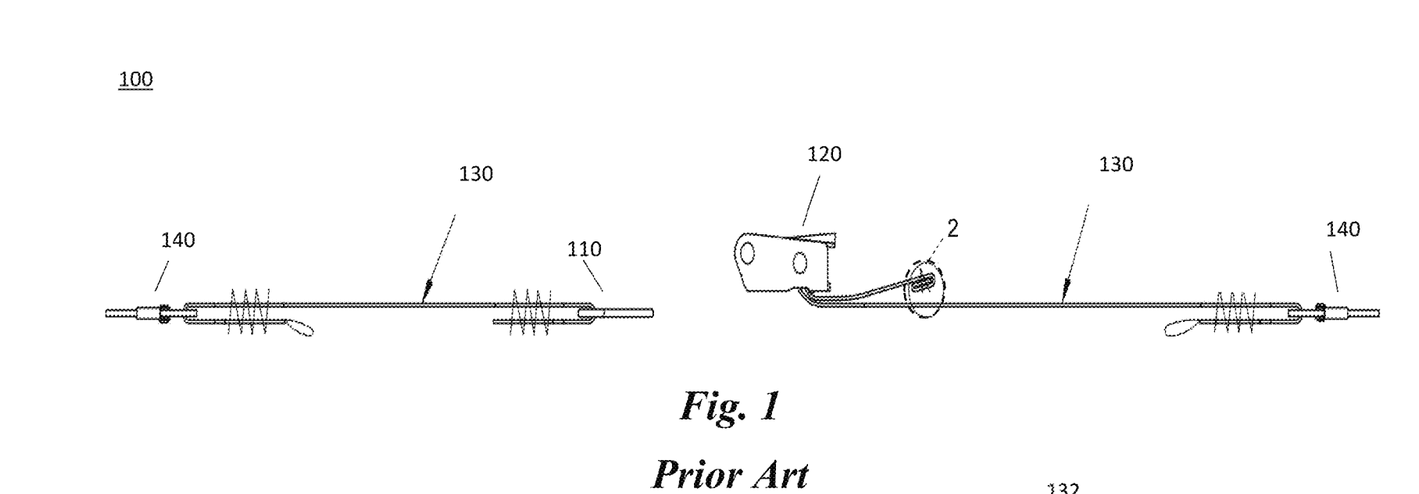
FIG. 1 shows a right side view of a lap belt as is known in the prior art.
Figure 2:
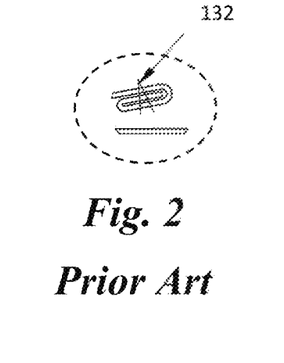
FIG. 2 shows an enlarged view of the double fold over end of the belt webbing of FIG. 1.
Figure 3:
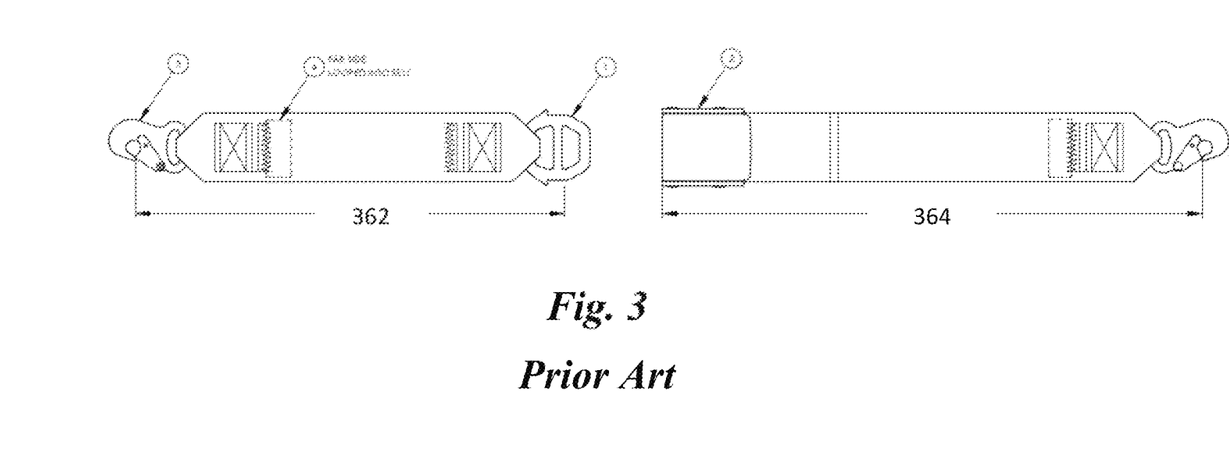
FIG. 3 shows a top view of the lap belt of FIG. 1.

FIGS. 1, 2, and 3—Prior Art Safety Restraints.

Referring now to the drawings in general and to FIG. 1 in particular, restraint devices such as the two-point seatbelt 100 shown in FIG. 1 maintain the seat occupant in his/her seat during a crash event by restraining the occupant's lap, but do nothing to restrict the forward motion of the head and legs of the occupant during a crash event.

Generally, a seatbelt 100, such as the one in FIG. 1, is known in the art to have a flexible webbing portion 130 extending from a first point, across the occupant's lap, to the second point, where the seatbelt 100 is securely attached. The belt webbing 130 is made from material that is known in the art for vehicle restraint systems. A two-point seatbelt 100 such as the one shown in FIG. 1 has two portions that are joined by releasably coupling a seat buckle latch 110 to a seat buckle 120 such as the "lift-lever" buckle depicted in FIG. 1. An anchor 140 attaches a seatbelt portion to a seat or other structure. The anchor 140 shown in FIG. 1 is a snap hook end fitting.

FIG. 2 shows a close-up view of the fold-over end portion 132 of the belt webbing 130.

FIG. 3 shows a top view of the seat belt 100. The "latch side" portion 362 is shown on the left-hand side and is a fixed length. The "buckle side" portion 364 is shown on the right-hand side and is of adjustable length by pulling or retracting of the loose end of the webbing.

In addition to seatbelts, many vehicles now employ airbag systems to provide a cushioning surface between the seated passenger and a monument (such as a dashboard, steering wheel, or bulkhead). Airbags are designed to mitigate injuries that may be sustained by the seat occupant forcefully contacting a part of the moving vehicle. Airbags can be programmed to sense sudden acceleration/deceleration events above a preset magnitude, such as, for example, a force nine times above the force of gravity, or "g-force." When an airbag sensor detects that an acceleration/deceleration event meets or exceeds the pre-set threshold of force, the airbag is deployed.

Seat belt pretensioners wind the seatbelt onto a reel to remove slack when subjected to a load. Pretensioning is known to reduce head path excursion (HE) by adjusting the tension of the seat restraint at the time of a crash event. HE is the distance between an initial position (pre-crash) and a final, forward-most position of the passenger's head (during crash). Reducing HE is important in commercial aircraft, as the distance between rows of seats or the distance from the seat to a forward partition may be small. To address passenger safety issues, tests are conducted to measure the HE of an occupant's head during a crash event.

While it is known in the art to use pretensioners in conjunction with lap belt systems, these pretensioning devices employ spring loaded reels with ratcheting mechanisms in order to take up slack in a lap belt. Various mechanisms integral to the pretensioning reel assembly can allow for tightening the lap belt and, selectively, releasing the lap belt in order to create more slack. Pretensioning reels as may be known in the art do not always provide the rapid pull on a restrained occupant that is necessary to counter the rapid forward motion in an impact scenario. In other applications, where space is at a premium, a bulky pretensioning mechanism may not be practicably installed in the vehicle.

It would be advantageous, then, to have a pretensioning lap belt apparatus, system, and related method that can provide superior performance over traditional pretensioning reel mechanisms, while employing the rapid deployment of an airbag.

SUMMARY OF THE INVENTION

We disclose a pretensioning lapbelt apparatus where the pretensioning of the lapbelt is performed by the rapid inflation of an airbag that is integral to the lapbelt itself. A preferred embodiment of the pretensioning lapbelt apparatus would comprise a length of seatbelt webbing with a latch fixed on one end and a cinching anchor slidable on the opposite end. Integral to the lapbelt and attached to each end of the webbing is an airbag. The airbag, as is known in the art, is configured to be flat and folded in a compact uninflated state, and then quickly inflate to its inflated state upon the introduction of an inflation gas triggered by a crash event. The design of the airbag, including the attachment locations of the ends of the webbing are chosen such that, upon inflation of the airbag, the free end of the webbing—the end of the webbing that is passed through the cinching latch—is pulled taught, thereby reducing the effective length of the lapbelt (the length between the latch and the cinching anchor). The anchor is designed to be a cinching anchor such that once the airbag deploys and pulls the webbing through the anchor (thereby pretensioning the lapbelt) a sliding pin in the anchor "cinches" the webbing, effectively locking the webbing in the pretensioned state. This feature is important and new to the art because, since airbags deploy quickly, they also deflate soon after the crash event. Having the cinching mechanism within the anchor results in a "lock" to keep the lapbelt pretensioned even after the airbag has deflated.

In embodiments, the apparatus comprises: a latch receivable into a buckle, the latch having a slot; a webbing having a proximal end and a distal end, where the proximal end of the webbing is threaded through the slot, folded back over itself and stitched together in fixed relation such that the latch is attached to the webbing at a fixed distance from the proximal end; an anchor having an anchor portion and a cinching portion, where the distal end of the webbing is threaded through the cinching portion and the anchor and the webbing remain in sliding relation; and an airbag, having a deflated state and an inflated state, and further having a first end fixedly attached to the proximal end of the webbing and a second end fixedly attached to the distal end of the webbing, whereby the apparatus is thus configured to have a first length from latch to anchor when the airbag is in the deflated state and to have a second length from latch to anchor when the airbag is in the inflated state, such that the second length is shorter than the first length.

Incorporated into a system, the apparatus disclosed can provide a complete pretensioning lapbelt system for occupant protection in a crash event. Components of the system would include the pretensioning lapbelt apparatus, as described above. The anchor end would be attached to a desired structure, such as a passenger seat frame or to the vehicle itself. A buckle component is also anchored to the seat structure or to the vehicle, itself, such that when the apparatus latch is inserted into the buckle, it forms a complete lapbelt to secure a passenger in the seat.

Additional components of the system may include an inflation system for the airbag, as well as, a crash detection unit that is configured to sense a crash event and trigger the inflation of the airbag.

A method of using the apparatus and system for the pretensioning of a lapbelt upon a crash event includes the steps of providing a pretensioning lapbelt system, as described above, that has been programmed with inflation parameters; sensing of a crash event by the pretensioning lapbelt system; deploying of the airbag; applying pretensioning force to the lapbelt by the airbag; and locking the lapbelt in place by the cinching anchor.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

As used throughout this disclosure, a "crash event" is any sudden acceleration/deceleration, collision, impact, rollover, etc . . . of a moving vehicle. Generally, safety features for moving vehicles are designed to protect seat occupants from injuries sustained when the moving vehicle experiences a crash event. Although the various embodiments of the present disclosure are shown and described within the context of a safety system for airplane passengers, one with ordinary skill in the art will appreciate and understand that the apparatuses, systems, and methods as described herein can also be advantageously applied in other types of moving vehicles, such as helicopters, automobiles, trucks, buses, carts, boats, and amusement park rides. It is to be understood that the embodiments as described are not, necessarily, limited to use with airplane seats. One with knowledge in the art will also understand that commonly used components associated with airbag assemblies are either not shown or not described in detail in order to avoid obscuring relevant aspects of the pertinent technology.

We disclose a pretensioning lap belt system whereby the pretensioning of the lap belt is accomplished by the action of an airbag integral to the lap belt as opposed to the action of a separate pretensioning reel or device. The present invention differs from the current state of the art in that the pretensioning of the lap belt is accomplished without utilizing a pretensioning mechanism such as a mechanical pretensioning belt retractor. Instead, the lap belt pretensioning is actuated by inflation of the airbag. The structure and configuration of the airbag integral to the lap belt is such that the inflation of the airbag provides the desired pretensioning of the lap belt to further secure the passenger in the seat and reduce forward translation. Essentially, the lap belt is attached to an airbag that, when the airbag is inflated, pulls on the lap belt, thereby tightening the lap belt with respect to the retrained occupant and seat.

Embodiments of the present disclosure are directed toward an occupant safety apparatus that leverages rapid airbag deployment to apply a pretensioning force to a lap belt during a crash event to avoid or mitigate injury to the seat occupant during the crash event. The pretensioning lap belt with an integrated airbag applies a pre-load to the lap belt to instantly at least remove any slack during a crash event, and optimally pull the occupant tighter into the seat, thus obtaining the following benefits and advantages, as compared to a standard lap belt:

1) Receive the maximum belt load faster.
2) Reduce pelvic forward translation from the belt pretensioning;
3) Reduce headpath forward translation from the pretensioned belt and inflated airbag combination;
4) Reduce lumbar load from the pretensioned belt and inflated airbag combination.
5) Increase the effectiveness of the forward translation reduction and lumbar tensile load reduction when combined with an under cushion airbag as disclosed in, for example, U.S. application Ser. No. 16/346,038, Apparatus, System, and Method for Repositioning Occupant in a Crash Event.

Figure 4:
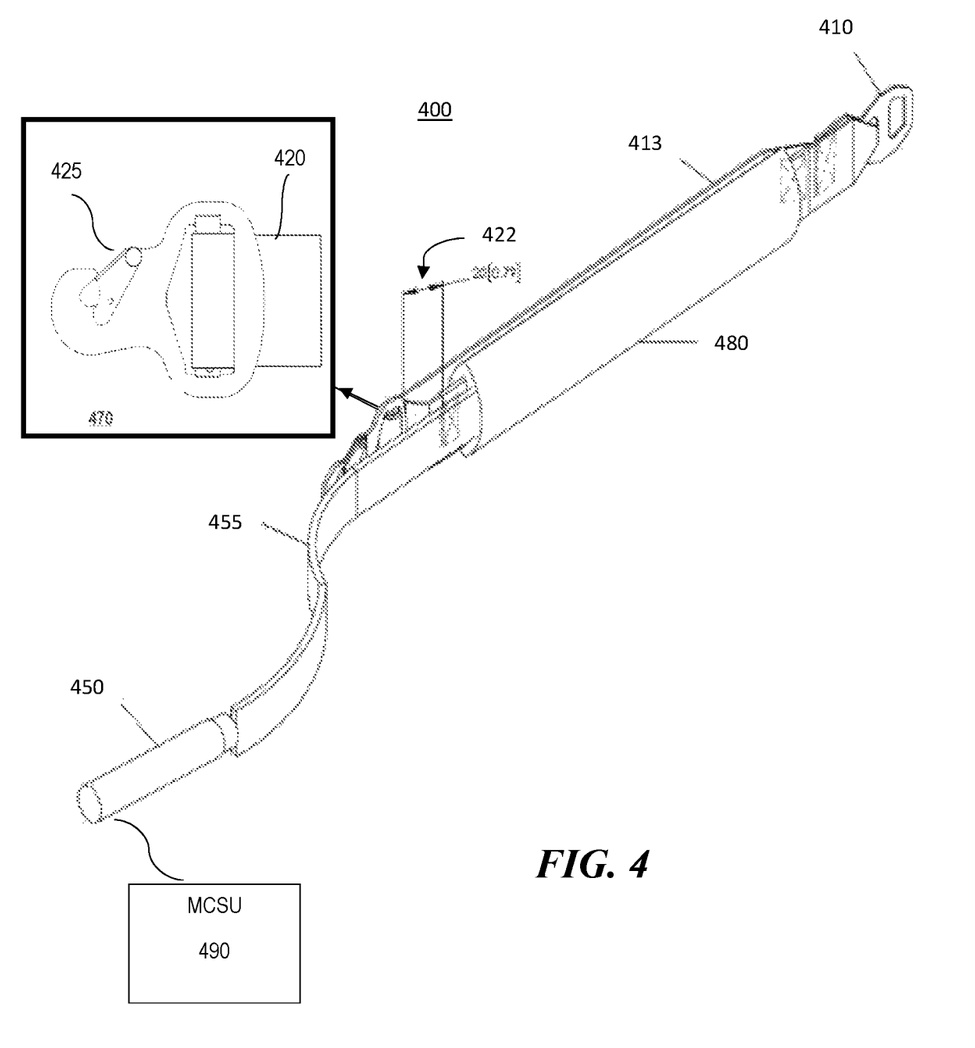
FIG. 4 is a composite view showing an illustration of the latch side of a pretensioning lap belt with the airbag in a stowed position, as well as an enlarged detail of the cinching anchor portion, according to an embodiment.
Figure 9:
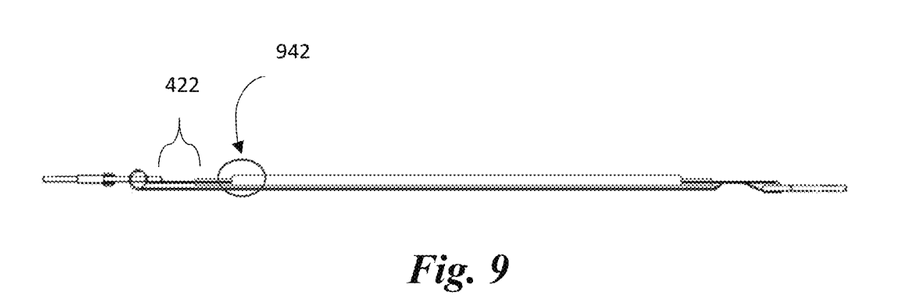
FIG. 9 is a side view of the latch portion of the lap belt with an airbag in the stowed position, according to an embodiment.

FIGS. 4 and 9—Pretensioned Lap Belt with Airbag in a Stowed State.

Returning now to the drawings, FIG. 4 shows the latch side of a pretensioning lap belt 400, according to an embodiment. The pretensioning lap belt 400 is shown with an integral airbag 480 in the stowed state. The lap belt 400 is secured just as any other lap belt, i.e., the pretensioning lap belt 400 is pulled over the occupant's lap and coupled to a buckle attached to the seat or other structure.

The airbag 480 is folded with a portion secured to the outer-facing lap belt webbing 413, such that when the airbag 480 deploys, it deploys outward and away from the seat occupant. This attachment point is shown, for example, in FIGS. 9 and 10 as attachment 942. In an embodiment, the thickness of the stowed airbag 480 is determined by the number of folds. The airbag 480 is attached on the "latch side" of a lap belt, which is typically of a fixed length. A seat occupant makes any belt length adjustments on the "buckle" side of the lap belt (not shown in FIG. 4, but may be substantially similar to "Buckle Side" 364 of FIG. 3).

In an embodiment, the length of the latch side determines the stowed length of the airbag 480. The length of the fixed portion of the lap belt also determines where the buckle is situated in relation to a passenger's lap. In some cases, shortening the latch side of the lap belt (resulting in a shorter airbag length) centers the buckle in relation to the passenger. Airbags are made in different sizes, but generally it is desirable to size the airbag so that a deployed airbag extends from the waist of the seat occupant to the seat occupant's thigh during inflation.

Figure 11:
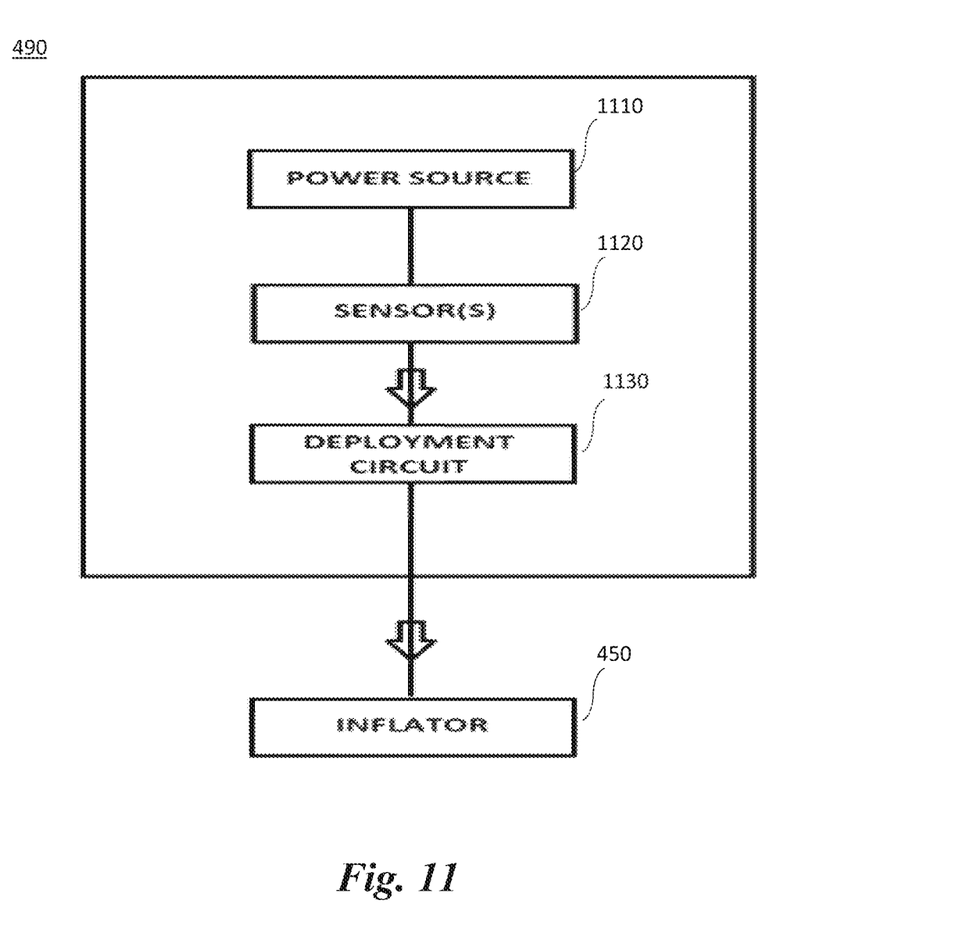
FIG. 11 is a simplified block diagram showing some of the components of the MCSU, according to an embodiment.

The airbag 480 also includes a programmable crash detection device, such as a mechanical crash sensor unit (MCSU) 490, coupled with an airbag inflator 450. The MCSU components are shown in FIG. 11. The inflator 450 is connected to a fill tube 455 which feeds into the airbag 480. The fill tube 455 is flat until inflated. In an embodiment, the inflator 450 includes a pressurized component forcing pressurized gas into the airbag 480 to inflate the airbag 480. The MCSU 490 includes sensors that sense the changes in gravitation force that signal an impending crash event and initiate the inflation of the airbag 480. The MCSU 490 is programmable such that it controls the timing, sequence, amount, and duration of airbag inflation (inflation parameters).

Cinching Anchor Mechanism 470.

The lap belt's pretensioning portion 420 is the end portion of the belt webbing 413 that is looped through the cinching anchor mechanism 470, with the tail end attached to the airbag 480 at attachment 942. The webbing 413 can be fastened or attached to the airbag 480 by sewing or other equivalent means. The cinching anchor mechanism 470 is comprised of a cinching latch portion with a spring loaded anchor lock 425 on one end and a loop and pin portion on the other end. The loop and pin portion is an opening in the anchor which contains a pin that is constrained in the opening but can translate back and forth within the opening in a direction perpendicular to the length of the pin. The pretensioning portion 420 of the webbing is looped through the opening and around the pin. In this way, when the pretensioning portion 420 of the webbing is pulled, the pin slides with it and captures the pretensioning portion 420 of the webbing against the opening and locks it from pulling loose.

When the pretensioning lap belt with airbag apparatus 400 is in the stowed state as shown in FIG. 4, before pretensioning, there is no pull on the pretensioning portion 420. The gap 422 between the airbag 480 and the cinching anchor mechanism 470 is at 20 mm. This means that there is approximately 20 mm of belt webbing exposed between the cinching anchor mechanism 470 and the airbag 480.

Normally, the airbag apparatus 480 is not visible while in the deflated state. By way of example, and not limitation, the airbag 480 is folded against the belt. The size and geometry of the airbag 480 is dependent upon the different embodiment configurations. For example, in one embodiment, the airbag 480 is only as large as is necessary to apply the pretensioning force. In other embodiments, the airbag 480 is sized larger to extend over the knees of the seat occupant, or up to the torso area, for more protection. The minimum airbag size is anticipated to be sufficient to pretension the attached seatbelt portion, in the range of 8 to 12 inches (305 mm) in length by way of example and not limitation.

Increasing the size of the airbag 480 allows for a greater reduction of the lumbar load during full forward extension of the seat occupant.

FIG. 9 shows an airbag 480 in the stowed state, before a crash event triggers inflation. FIG. 9 also shows the attachment point 942 where the pretensioning portion 420 attaches to a point on the airbag 480. Although configurable based upon the desired slack-pull required and the geometry of the airbag 480, a pretensioning lap belt pull of about 25 to 100 mm of slack from the tightened lap belt has been shown to achieve the desired results.

Figure 5:
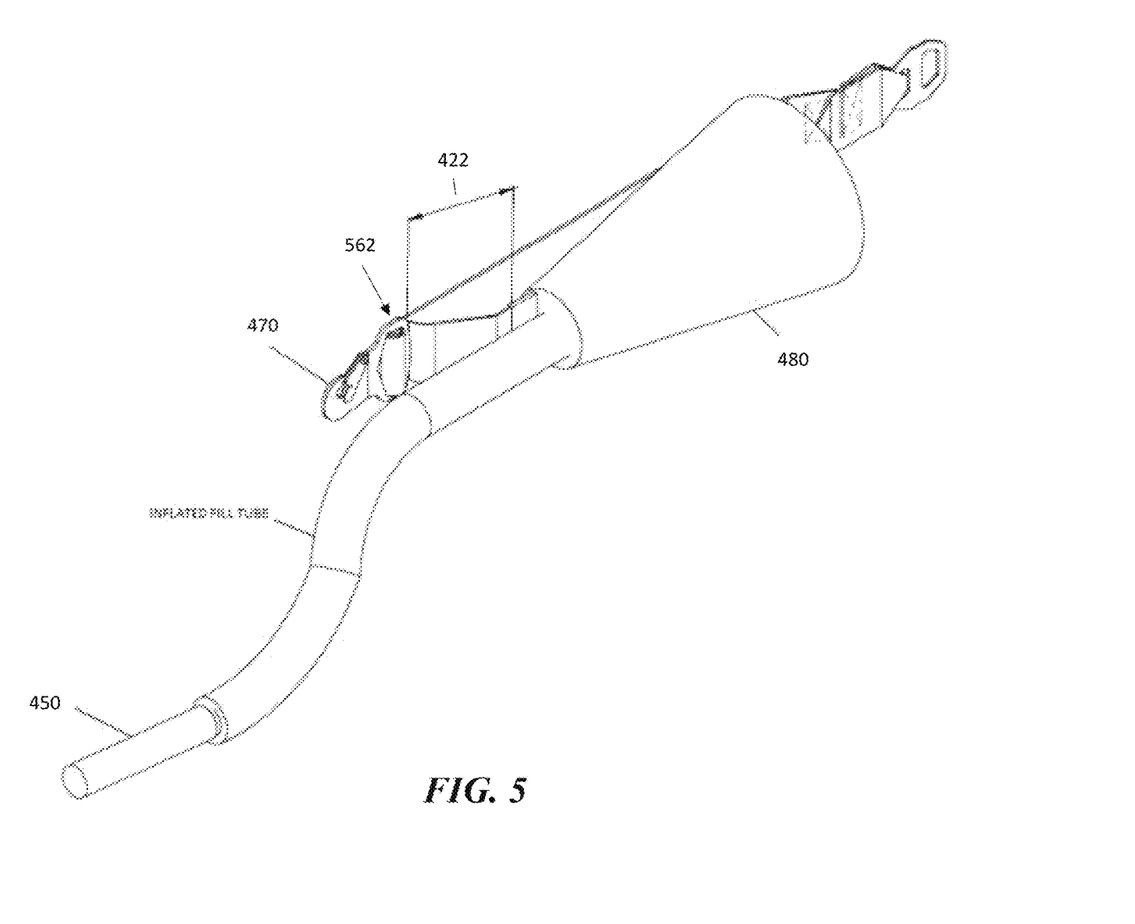
FIG. 5 is an illustration of the latch side of a pretensioning lap belt with the airbag inflated, according to an embodiment.
Figure 10:
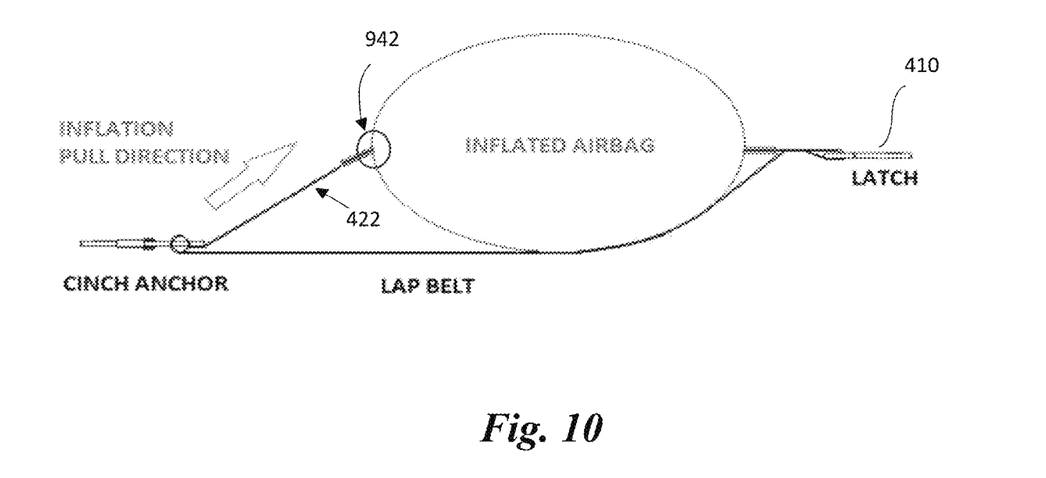
FIG. 10 shows the lap belt of FIG. 9 with a deployed airbag causing a retraction of the pretensioning reel, according to an embodiment.

FIGS. 5 and 10—Pretensioned Lap Belt with Inflated Airbag.

FIG. 5 shows a portion of the pretensioning lap belt with the airbag 480 in the deployed state, at the start of a crash event. This illustration demonstrates how the deployed airbag 480 acts as a pretensioner by exerting directional force on the pretensioning portion 420. In a crash event, the "pretensioning" happens because of configuration of the airbag/belt webbing, located on the latch side of the lap belt. Effectively shortening—or tightening—that part of the belt whereby that shorter length is then held in place by the cinching anchor bar 562 of the cinching anchor mechanism 470. The cinching anchor bar 562 "locks" the pretensioned lap belt in place once shortened. In tests, the pretensioning lap belt regularly pulled approximately 50 mm of slack from the tightened lap belt.

FIG. 5 shows the displacement of the webbing 413, extended from 20 mm to 70 mm, for a total extension of 50 mm/2.0 inches total, thus tightening the belt, removing any slack. Once pretensioned in this manner, the cinch lock bar 562 holds the belt in place in this position, preventing loosening of the lap belt.

Airbags 480 are constructed of a lightweight, flexible material such as nylon and are stowed in a deflated state which can include a folded condition. Favorable test results have been reported with inflated airbag diameters of four, six, eight, and ten inches, but other diameters can also achieve desired results. In the embodiment depicted in FIG. 5, the airbag 480 is cone-shaped, with a size of about 10" diameter×about 14" length. The tested volume of the airbag 480 is about 395 in$^3$. One with knowledge in the art will appreciate that the airbag 480 is not limited to the size and shape shown in this exemplary depiction.

FIG. 10 shows another view of the inflated airbag 480 during a crash event. Note that the pretension gap 422 has lengthened to approximately 70 mm, representing a pretensioning length of 50 mm caused by the pull of the airbag 480 on the pretensioning portion 420. The end of the pretensioning portion 420 is attached to the airbag 480 at attachment point 942. FIG. 10 shows that the airbag 480 is attached to the belt webbing 413 at its end points, and possibly at a third point or points close to the latch 410, leaving the remainder of the belt webbing 413 unattached so that, upon inflation, the airbag 480 is able to lift away from the belt webbing 413 and "pull" the pretensioning portion 420. FIG. 10 illustrates how the pretensioning portion 420 has been pulled by the airbag's inflation. Since the pretensioning portion 420 is merely an end section of the fixed-length belt that is wound around the cinching latch 425, any lengthening of the pretensioning portion 420 shortens the remainder of the belt webbing 413.

Figure 6:
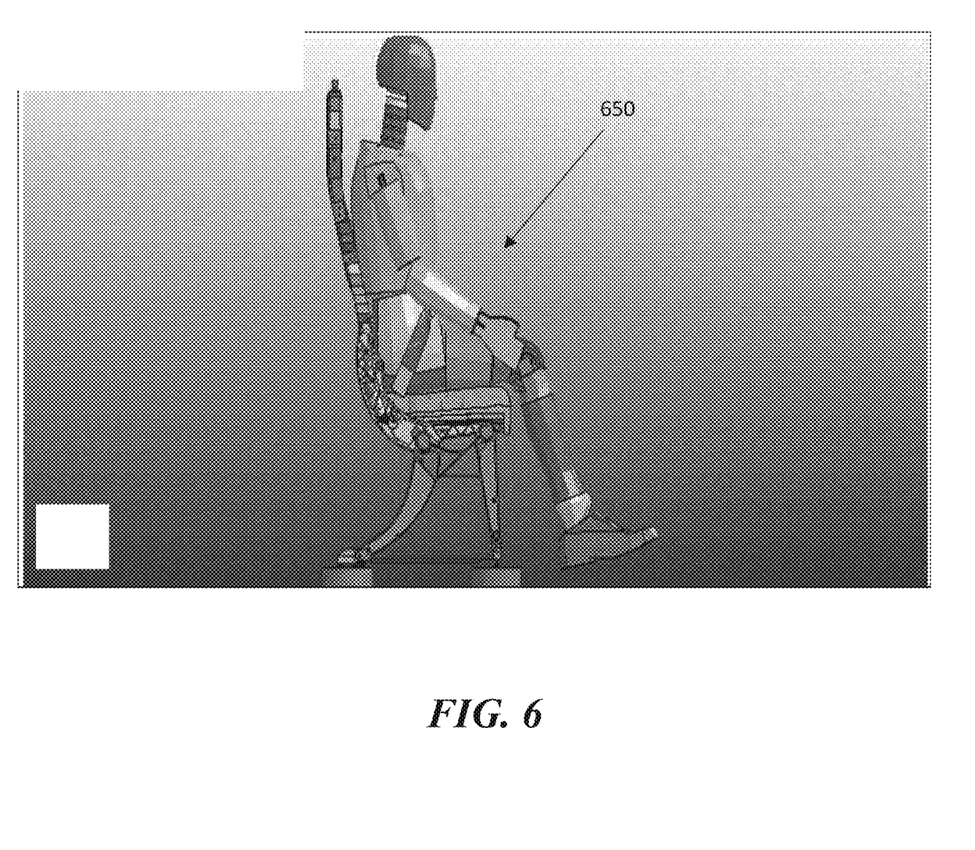
FIG. 6 shows a side view of a test dummy with a standard 2-point lap belt, before a crash event.
Figure 7:
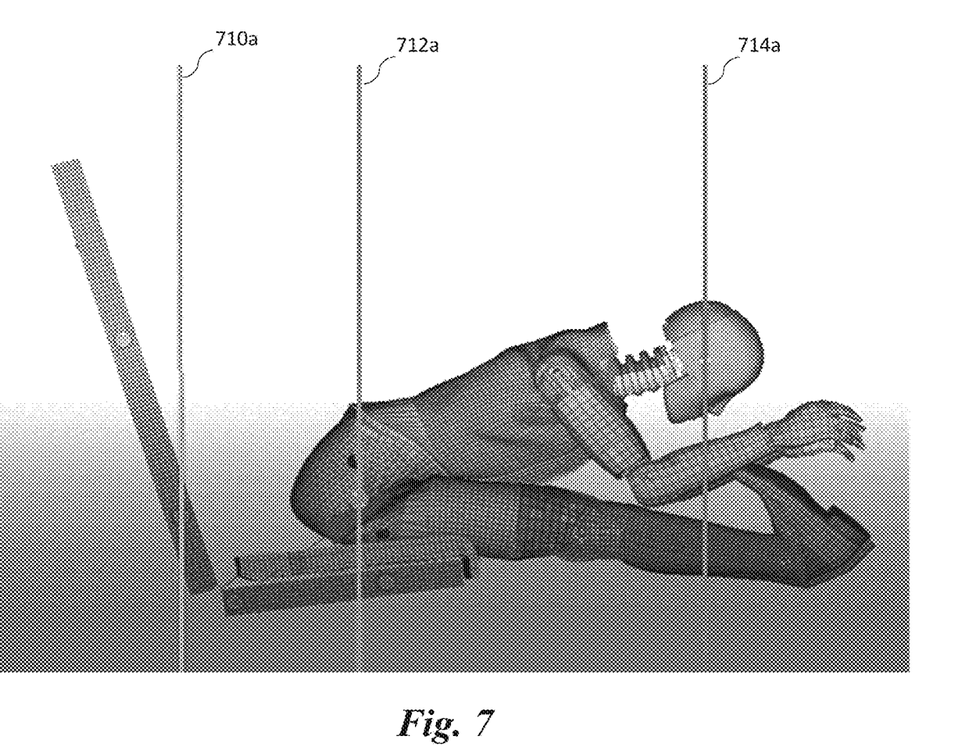
FIG. 7 shows a side view of the test dummy with a standard 2-point lap belt of FIG. 6, during a crash event.
Figure 8:
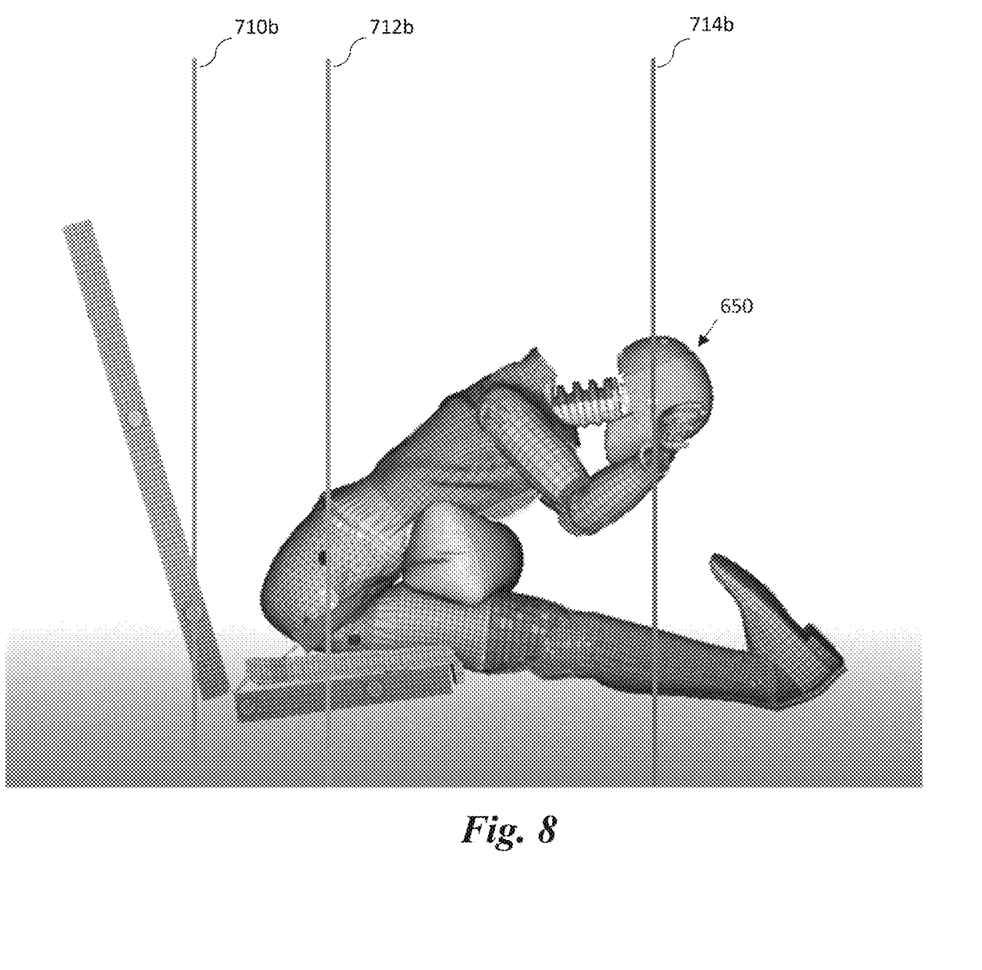
FIG. 8 shows a side view of a simulation of the test dummy of FIG. 7 with a deployed airbag during a crash event.

FIGS. 6, 7, and 8—ATD Tests.

FIG. 6 shows a three-dimensional anthropomorphic test dummy ("ATD") 650 commonly used to test safety equipment on automobiles and aircraft. The ATD 650 is modeled to conform to standard human body shape, height, weight, body mass, flexibility, and center of gravity. The ATD 650 is designed to reproduce the posture, flexibility, and movement of a human seat occupant before, during, and after a crash event. The ATD 650 in FIG. 6 is shown seated in an upright position, before a crash event, wearing a two-point lapbelt such as the belt shown in FIG. 1. A crash test was conducted with a duration of approximately 150 milliseconds.

FIG. 7 shows the ATD 650 during the crash event. When g-forces begin to act on the ATD 650, the test dummy's torso moves forward slightly and the legs begin to rise. During the phase of the crash event depicted here, the test dummy's head and torso are thrown completely forward, at approximately 149 milliseconds from the onset of the crash event. At this point, the test dummy 650 has now moved forward as far as the restraint apparatus allows, and the legs are fully extended. Note the displacement of the test dummy's head along the x-axis, head target line 714a. In this simulation, the test dummy's head has been thrown forward approximately 30 inches. Also note the displacement of the test dummy's lumbar area (lower spine) during the crash event.

The ATD 650 of FIG. 7 illustrates the body posture and position of a test dummy 650 during a crash event, with a standard two-point lapbelt restraint apparatus, such as the one shown in FIG. 1, engaged. Note the test dummy's position with respect to the seat reference point line 710a, the hip target line 712a and the head target line 714a. Once the crash event occurs, the seat occupant's forward translation loads the lap belt. The loaded lap belt starts the forward translation reduction and torso rotation to restrain the ATD 650 to the seat.

FIG. 8 shows a simulation illustrating the body posture and position of the ATD 650 during a crash event, using the pretensioning lap belt with airbag apparatus 400, according to an embodiment. The size of the airbag 480 can vary depending on the length of the fixed ("latch side") portion 362 of the belt, which determines the airbag position on the lap. FIG. 8 shows that the ATD 650 has now moved forward as far as the restraint apparatus allows. At this point the test dummy's legs are fully extended at approximately 150 milliseconds into the crash event, yet the airbag deployment has reduced the HE. The airbag 480 is fully deployed and the test dummy 650 has been propelled as far forward as the seat belt allows.

These illustrations demonstrate the effectiveness of the pretensioning lap belt/airbag combination in reducing headpath and forward translation. As measured from the seat back, the difference in the hip target line placement (712a to 712b) represents the forward translation reduction and the difference in the head target line placement (714a to 714b) represents the headpath reduction at 149 ms. The difference in the torso angle affects the lumber load. Note in FIG. 8 the torso angle measured from the thigh is greater than in FIG. 7. The ATD in FIG. 7 would have a higher tensile lumber load.

Comparing the position of the test dummy 650 of FIG. 7 with the position of the test dummy 650 of FIG. 8, it becomes immediately apparent that the deployment of the airbag in combination with the pretensioning lap belt, as shown in FIG. 8 drastically reduces the forward path of the test dummy 650.

FIG. 11 is a simplified block diagram of the components of the MCSU 490, according to one embodiment. A power source 1110 provides the power to a sensor assembly 1120 and the deployment circuit 1130. Responsive to the sensor assembly 1120 detecting the rapid forward acceleration/deceleration of a crash event, the deployment circuit 1130 sends a signal to the inflator assembly 450, which in turn initiates the gas generation and fills the airbag 480.

The sensor assembly 1120 can include at least one accelerometer and can communicate directly with the deployment circuit 1130 to trigger inflation of the airbag 480 via the inflator assembly 450. In another embodiment, the sensor assembly 1120 communicates with a programmable controller which activates the deployment circuit 1130. The inflator assembly 450 can include a gas generator.

Figure 12:
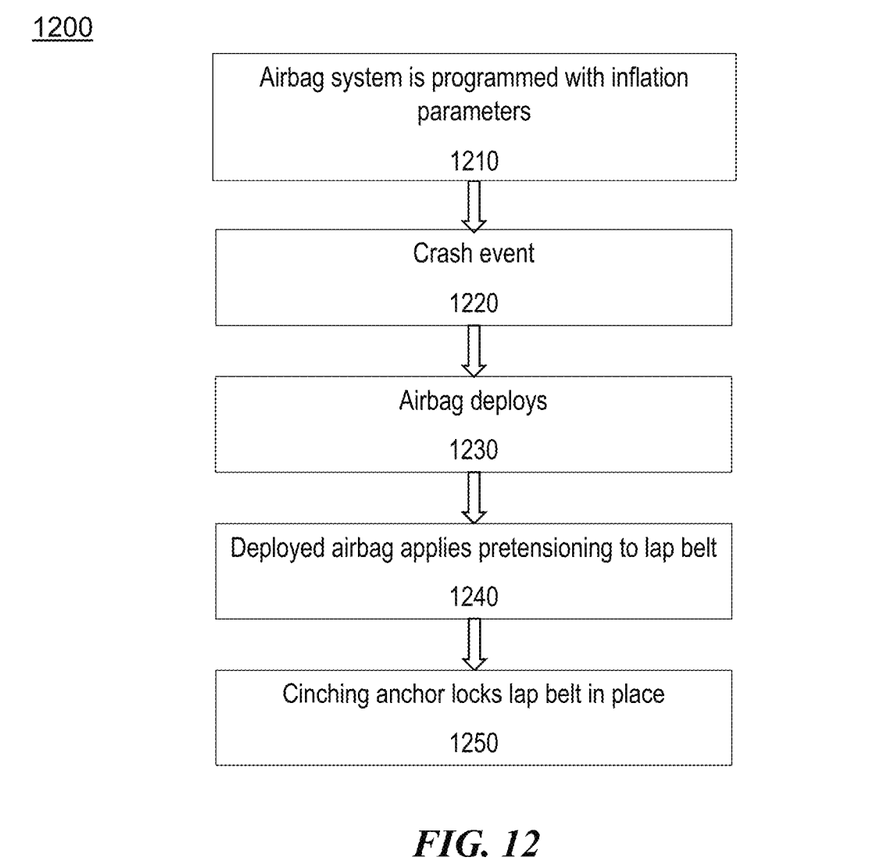
FIG. 12 is a high-level operational flow diagram of a method for securing a seat occupant, according to an embodiment.

FIG. 12 is a high-level operational flow diagram 1200 of a method for safely restraining an occupant during a crash event, according to an embodiment. Initially, the lapbelt/airbag apparatus 400 is programmed with the inflation parameters, then the lapbelt/airbag apparatus 400 is attached to a seat structure. The seat occupant routes the lap belt portion (with pretensioning portion 420) over the pelvis and inserts the latch 425 into the buckle. In this manner, the seat occupant is secured/belted to the seat structure. The integral airbag 480 adds an additional layer of safety and protection.

In step 1220 a crash event occurs. Responsive to detecting the crash event, the airbag apparatus 480 is deployed in step 1230 to pretension the lap belt according to the programmed parameters. The rate, sequence, and timing of deployment can be pre-programmed. The pretensioning lap belt with airbag apparatus 400 is configured such that the airbag portion 480, when deployed, inflates outward and away from the belt 413 in step 1240. This outward inflation pulls pretensioning portion 420, causing pretensioning of the lap belt 413. This pretensioning occurs sooner in the crash event than in known lap belts with traditional pretensioners and pretensioning mechanisms due largely in part to the speed with which the airbag triggers and inflates in response to a crash event.

In this pre-tensioned state the forward translation of the seat occupant is arrested by the cinching anchor 425 locking the pretensioning portion 420 to prevent release of the pretensioning portion 420, in step 1250. This pretensioning reduces the seat occupant's forward translation and lumbar load is reduced, when compared to a standard lap belt.

In one example, the airbag apparatus 480 includes inter alia an inflator, an airbag, and a bladder (not shown). As shown in FIG. 8, the airbag apparatus 480 is attached to the lap belt 413 and configured so that the airbag portion, upon inflation, not only restricts head arc but, more importantly, pulls the lapbelt tight so that in this pretensioned state the occupant cannot translate forward. The result is that, by utilizing the invention disclosed herein, an increased level of occupant safety can be realized than without the use of such an apparatus. This is accomplished, mainly, because of the early pretensioning of the occupant's lap belt, which is desirable.

The airbags can be of different sizes and shapes. As an example, crash tests have been conducted with airbags having diameters of four, six, eight and ten inches, when inflated.

The airbag apparatus is disposed along the fixed portion of the seatbelt and configured so that the airbag portion, upon inflation, provides the pretensioning described above, but also affords additional cushioning and protection of a seat occupant. The result is that, by utilizing the invention disclosed herein, an increased level of occupant safety can be reached than without the use of such an apparatus. This is accomplished, mainly, because the airbag 480 initiates an early pretensioning of the occupant's lapbelt, which is desirable. Further, the re-positioning of the occupant reduces the forward extent of the arc of the head travel in a forward crash and, by definition, allows a seat to be positioned closer to a forward monument, bulkhead, or another obstacle.

In a preferred embodiment, a pretensioning lap belt system for securing a seat occupant in a moving vehicle during a crash event, comprises a passenger restraint such as a lap belt that is anchored to a fixed structure. Preferably, the lap belt is a two-point style lap belt where each end of the belt is anchored to a structural point on a vehicle seat. The lap belt has two main parts, namely, a buckle side and a latch side.

The scope of this invention is not limited however to two-point lap belts. Three-point and four-point restraints are also well suited to be configured with the safety device as disclosed herein.

The buckle side is as may be known in the art—having one end anchored (as described above, and using a seatbelt anchor as is known in the art) and the other end with a buckle—the two ends attached via a fixed length of seatbelt webbing material.

The latch side of this preferred embodiment is new to the art, and has a latch configured to be received in the buckle. The latch is fixedly attached to one end of a length of seatbelt webbing. The other end of the seatbelt webbing is threaded through an opening in a cinching anchor, described above and in the figures, and around the sliding pin of the cinching anchor. This end of the seatbelt webbing is fixedly attached to a portion of an airbag, which, in its folded state, is disposed within and along the length of seatbelt webbing between the cinching anchor and the latch.

It is understood by those with ordinary skill in the art, and it is the intention of this disclosure, that the innovation disclosed herein lies in the structures and components related to the pretensioning of the lap belt through the action of the integral airbag and cinching anchor, and that the latch itself and the buckle itself may be swapped in position—meaning, the latch may be on the fixed length portion of the lap belt, and the buckle may be on the pretensioning portion of the lap belt without changing the scope or function of the invention.

The preferred embodiment of the system disclosed additionally includes an airbag apparatus with an airbag in a normally deflated state disposed along a length of an outward-facing side of the fixed-length portion of the lap belt, such that inflation of the airbag away from the belt webbing exerts a pull on the pretensioning portion, thereby pretensioning the lap belt.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A pretensioning lapbelt apparatus comprising:
   a latch receivable into a buckle, the latch having a slot;
   a webbing having a proximal end and a distal end, where
   the proximal end of the webbing is threaded through the slot, folded back over itself and stitched together in fixed relation such that the latch is attached to the webbing at a fixed distance from the proximal end;

an anchor having an anchor portion and a cinching portion, where the distal end of the webbing is threaded through the cinching portion and the anchor and the webbing remain in sliding relation; and an airbag, having a deflated state and an inflated state, and further having a first end fixedly attached to the proximal end of the webbing and a second end fixedly attached to the distal end of the webbing, whereby the apparatus is thus configured to have a first length from latch to anchor when the airbag is in the deflated state and to have a second length from latch to anchor when the airbag is in the inflated state, such that the second length is shorter than the first length.

2. A system for the rapid pretensioning of a lapbelt, the system comprising:

a pretensioning lapbelt apparatus having:

a latch receivable into a buckle, the latch having a slot;

a webbing having a proximal end and a distal end, where the proximal end of the webbing is threaded through the slot, folded back over itself and stitched together in fixed relation such that the latch is attached to the webbing at a fixed distance from the proximal end;

an anchor having an anchor portion and a cinching portion, where the distal end of the webbing is threaded through the cinching portion and the anchor and the webbing remain in sliding relation; and an airbag, having a deflated state and an inflated state, and further having a first end fixedly attached to the proximal end of the webbing and a second end fixedly attached to the distal end of the webbing, whereby the apparatus is thus configured to have a first length from latch to anchor when the airbag is in the deflated state and to have a second length from latch to anchor when the airbag is in the inflated state, such that the second length is shorter than the first length; and an airbag inflation mechanism configured to detect a crash event and rapidly inflate the airbag to the inflated state upon detecting the crash event, whereby the system produces the rapid pretensioning of the lapbelt through the action of the airbag acting directly on the lapbelt shortening it from the normal length to the shorter pretensioned length, and the engagement of the cinching anchor locks the lapbelt in the shorter pretensioned length.

3. A method of pretensioning a lapbelt, the method comprising:

providing a pretensioning lapbelt system having:

a pretensioning lapbelt apparatus having:

a latch receivable into a buckle, the latch having a slot:

a webbing having a proximal end and a distal end, where the proximal end of the webbing is threaded through the slot, folded back over itself and stitched together in fixed relation such that the latch is attached to the webbing at a fixed distance from the proximal end;

an anchor having an anchor portion and a cinching portion, where the distal end of the webbing is threaded through the cinching portion and the anchor and the webbing remain in sliding relation; and an airbag, having a deflated state and an inflated state, and further having a first end fixedly attached to the proximal end of the webbing and a second end fixedly attached to the distal end of the webbing, whereby the apparatus is thus configured to have a first length from latch to anchor when the airbag is in the deflated state and to have a second length from latch to anchor when the airbag is in the inflated state, such that the second length is shorter than the first length; and an airbag inflation mechanism configured to detect a crash event and rapidly inflate the airbag to the inflated state upon detecting the crash event;

sensing of the crash event by the airbag inflation mechanism;

inflating of the airbag by the airbag inflation mechanism;

deploying of the airbag;

pretensioning of the lapbelt by the airbag through the action of the airbag acting directly on the webbing, shortening it from the normal length to the shorter pretensioned length; and locking of the webbing by the anchor to the shorter pretensioned length.

* * * * *